United States Patent
Scott

(10) Patent No.: US 10,116,708 B2
(45) Date of Patent: Oct. 30, 2018

(54) SIP SIGNALLING

(71) Applicant: Metaswitch Networks Limited, Enfield, Middlesex (GB)

(72) Inventor: Philip Anthony Scott, Middlesex (GB)

(73) Assignee: Metaswitch Networks Limited, Enfield, Middlesex (GB)

( * ) Notice: Subject to any disclaimer, the term of this patent is extended or adjusted under 35 U.S.C. 154(b) by 4 days.

(21) Appl. No.: 14/263,839

(22) Filed: Apr. 28, 2014

(65) Prior Publication Data

US 2015/0016446 A1    Jan. 15, 2015

(30) Foreign Application Priority Data

Apr. 30, 2013   (GB) .................................. 1307810.0

(51) Int. Cl.
*H04L 29/06*   (2006.01)

(52) U.S. Cl.
CPC ...... *H04L 65/1006* (2013.01); *H04L 65/1046* (2013.01); *H04L 65/1069* (2013.01); *H04L 69/24* (2013.01)

(58) Field of Classification Search
CPC ............. H04L 65/1006; H04L 65/1046; H04L 65/1069; H04L 69/42; H04L 1/22; H04L 29/06; H04L 12/569; H04L 29/06163
See application file for complete search history.

(56) References Cited

U.S. PATENT DOCUMENTS

| | | | |
|---|---|---|---|
| 2005/0262251 A1 | 11/2005 | Klemets et al. | |
| 2007/0019622 A1* | 1/2007 | Alt | H04L 29/06027 370/352 |
| 2009/0103540 A1* | 4/2009 | Froment | H04L 29/125 370/392 |
| 2009/0257418 A1* | 10/2009 | Allen | H04M 7/123 370/338 |
| 2010/0241754 A1* | 9/2010 | Niiya | H04L 65/105 709/228 |

* cited by examiner

*Primary Examiner* — Gary Mui
*Assistant Examiner* — Stephen N Steiner
(74) *Attorney, Agent, or Firm* — Stetina Brunda Garred & Brucker

(57) ABSTRACT

The present invention relates to signalling between entities in a SIP protocol communication in which the transport protocol can be changed during the call to provide improved call reliability.

28 Claims, 3 Drawing Sheets

SIP SIGNALLING

CROSS REFERENCE TO RELATED APPLICATIONS

The present application claims priority to UK Patent Application No. 1307810.0 filed Apr. 30, 2013, the entirety of the disclosure of which is expressly incorporated herein by reference.

STATEMENT RE: FEDERALLY SPONSORED RESEARCH/DEVELOPMENT

Not Applicable.

FIELD OF THE INVENTION

The present invention relates to controlling the transport protocol used for SIP signalling.

BACKGROUND

Session Initiation Protocol (SIP) is a signalling protocol used for managing calls and other multimedia sessions over an IP network. SIP can be used for initiating, controlling and terminating such sessions. These interactions are carried out using requests and responses passed between the calling and called parties.

SIP messages are normally transferred using User Datagram Protocol (UDP) or Transmission Control Protocol (TCP) as the transport protocol. Each of these has its own advantages and drawbacks. TCP, which is a connection-oriented protocol, has the advantage of guaranteeing transmission of messages. However, this can be problematic when the connection between endpoints fails. UDP, which is connectionless, can suffer from packet loss. However, UDP allows signalling to continue after a failover to a backup device.

As a result, both of these protocols provide greater advantage in different situations and conditions. Consequently, neither has an overriding advantage and there is divided opinion on which protocol should be preferred overall. It is estimated that the proportion of applications using TCP is roughly similar to those using UDP, with perhaps a slight preference towards UDP.

FIG. 1a shows a simple network configuration to demonstrate the issues. This network includes two phones 12,14, each connected to two different servers 10,11 from behind a NAT (network address translation) device 13,15. Server A is the primary server and Server B is a backup server.

In this example, each phone would normally register with the primary server (Server A) over TCP, thus setting up a TCP pinhole through the network address translation (NAT) device 13. When a phone wishes to initiate a call, it will send a standard SIP INVITE message, which will also use this TCP pinhole. TCP might be used for several reasons. TCP supports fragmentation so does not impose a limit on the size of a message and call set-up can often involve large messages to include all the media information. TCP is more secure, particularly where NATs are concerned, because it allows better identity and address authentication. TCP also guarantees transmission and servers, particularly in large networks, do not want the overhead of dealing with retransmissions.

Once the call has been initiated over TCP, the media path flows directly from Phone A to Phone B and so is not vulnerable to any problems with the servers. The signalling path for in-call updates and session refreshes, however, still flows along the same TCP connection (Phone A→Server A→Phone B), so any in-call SIP messages need to use this path.

In the example of FIG. 1b, Server A becomes unavailable during the call, for example because it crashes or because of a network failure. This will cause the TCP connections to Phones A and B to be torn down and, most likely, the call to be terminated. Even if the call is not terminated immediately, no further signalling will succeed so any in-call updates or session refreshes that would normally keep the call active will fail.

This means that if both parties want to continue talking, Phones A and B need to attempt to re-establish the call through Server B. This will certainly cause the call to be dropped and the end user to have to perform manual steps to re-establish communication with a new call.

If the call had been initiated using UDP, rather than TCP, the failure of Server A would not cause the call to be terminated. This is because UDP is a 'connectionless' transport and so the failure of one server does not prevent another from sending messages related to the same call or session. In the example of FIG. 1b, this means that Server B could take over communication with the two endpoints. This would allow the call to continue using Server B for any in-call updates or session refreshes.

As shown in FIG. 1a, the phones (or clients) are behind a NAT device which restricts access to the phone from outside, including from the server. The server can only contact the phone if a NAT pinhole has been opened, usually by the phone sending a message out through the NAT. Thus if the phone has contacted the server using TCP then a TCP pinhole may be open allowing communications from the server to the phone using TCP. Similarly, if the phone has contacted the server using UDP then a UDP pinhole will be opened allowing communications from the server to the phone using UDP. However, if TCP is used to establish a SIP call and a server fails, it is not possible to switch to using UDP without opening a pinhole in the NAT first. As the pinhole can only be opened by the phone/client, the server would have to wait for communication to be re-established before it could send any messages.

The present invention aims to avoid or ameliorate some of the problems with the system described above.

The problem this invention aims to address is how to obtain the benefits of using TCP in registrations and call set-up, but also make use of the benefits of UDP in being able to preserve signalling following a failure of a connection or server. This is particularly relevant to clients or phones behind NAT devices or firewalls.

SUMMARY OF THE INVENTION

According to the present invention there is provided a SIP call server for initialising and managing SIP calls comprising: an input for receiving TCP SIP call set up messages sent in order to establish a call with a call initiator; a response message generator for generating at least one response message specifying UDP as the new transport protocol; and an output for sending said at least one response message to the call initiator.

The present invention also provides a method of controlling a SIP call server for initialising and managing SIP calls, the method comprising: receiving a TCP SIP call set up message sent in order to establish a call with a call initiator; generating at least one response message specifying UDP as the new transport protocol; and sending said at least one response message to the call initiator.

With the invention, UDP is specified as the new transport protocol so that response messages from the call initiator as sent using UDP. This opens a pinhole in the firewall of the call initiator to allow UDP messages to be received by it and thereby allowing two-way communication using UDP.

The at least one response message may specify UDP as the new transport protocol using the "Contact" header. The set up message is preferably a SIP INVITE message.

The at least one response message is preferably a "200 OK" response message specifying UDP as the new transport protocol. Other messages may be used to specify UDP as the new transport protocol, for example, the "180 Ringing" response.

The output preferably sends subsequent messages to the call recipient using UDP.

The present invention also provides a SIP call server for initialising and managing SIP calls comprising: a call initiator arranged for generating a SIP call set up message, the set up message specifying that response messages should be sent using UDP as the transport protocol; and an output for sending said SIP call set up message to a call recipient using TCP as the transport protocol.

The present invention also provides a method of controlling a SIP call server for initialising and managing SIP calls, the method comprising: generating a SIP call set up message, the set up message specifying that response messages should be sent using UDP as the transport protocol; and sending said SIP call set up message to a call recipient using TCP as the transport protocol.

Preferably, the call set up message specifies UDP as the response transport protocol using the "Via" header. The call set up message may be a SIP INVITE message.

In response to a received response message the output preferably sends an acknowledgement message using UDP. Subsequent messages to the call recipient are preferably sent using UDP.

In reply to a received response message, acknowledgement messages are preferably sent using UDP. Subsequent messages to the call recipient are preferably sent using UDP.

The present invention also provides a SIP user agent for initialising and managing SIP calls comprising: a call initiator arranged for generating a SIP call set up message and specifying in the set up message that response messages should be sent using UDP as the transport protocol; an output for sending said SIP call set up message using TCP as the transport protocol to a server; and an input arranged to receive response messages to determine if the call set up has been successful.

The present invention also provides a method of controlling a SIP user agent for initialising and managing SIP calls, the method comprising: generating a SIP call set up message and specifying in the set up message that response messages should be sent using UDP as the transport protocol; sending said SIP call set up message using TCP as the transport protocol to a server; and receiving response messages to determine if the call set up has been successful.

Preferably, the call set up message specifies UDP as the transport protocol using the "Contact" header.

A SIP INVITE message may be used as the call set up message. In response to a received response message, an acknowledgement message may be sent using UDP.

Subsequent messages to the server are preferably sent using UDP. The "Contact" header may be used to specify UDP as the transport protocol. The call set up message may be a SIP INVITE message.

In response to a received response message, an acknowledgement message may be sent using UDP. Subsequent messages to the server may be sent using UDP.

The present invention also provides a SIP user agent for initialising and managing SIP calls comprising: an input responsive to TCP SIP call set up messages from a call initiator; a message generator arranged to generate at least one configuration message; and an output for sending said configuration message using UDP as the transport protocol, wherein said message generator generates a response message specifying that further messages should be sent using UDP as the transport protocol; and said output sends said response message to the call initiator.

The present invention also provides a method of controlling a SIP user agent for initialising and managing SIP calls, the method comprising: receiving a TCP SIP call set up message from a call initiator; generating at least one configuration message; sending said configuration message using UDP as the transport protocol; generating a response message specifying that further messages should be sent using UDP as the transport protocol; sending said response message to the call initiator using TCP as the transport protocol.

Preferably, the response message specifies UDP as the new transport protocol using the "Contact" header. The call set up message is preferably a SIP INVITE message.

Subsequent messages to the server are preferably sent using UDP as the transport protocol.

This invention describes an approach that permits switching from TCP to UDP mid-call so that network operators do not need to weigh up the advantages and disadvantages of choosing one transport over the other—they are able to take the best parts of both.

In this document references to phone generally refer to the equipment available to the calling or called party. This may be a traditional hardware telephone with an IP network connection, a computer with a SIP user agent (e.g. a softphone), a SIP gateway or PBX and so on. References to servers generally refer to a device for managing calls that sits between the calling and called party devices in the network. It may also be a proxy or relay in the path between the two calling parties. The pathway through the network between the calling parties may include a number of steps with intermediate servers or proxies. However in this document, only one end of the pathways are considered between one phone and a server.

With the present invention, only one element of the communication chain needs to be modified to obtain the advantages of the invention. This may be a phone or a server. The other device does not need any knowledge of the invention and merely needs to work according to the SIP specification (RFC 3261). Equally, the invention also works where both the server and the phone are adapted according to the invention.

BRIEF DESCRIPTION OF THE DRAWINGS

A specific embodiment of the invention will now be described in more detail with reference to the attached drawings in which.

DETAILED DESCRIPTION OF THE INVENTION

In a typical SIP call set up, the calling phone sends a SIP INVITE message to a server. The server may respond to the INVITE message with a provisional response (usually a "180. Ringing" message) confirming receipt of the invite and indicating that the recipient of the call is being alerted, e.g. the phone is ringing. When the recipient answers the call, a "200 OK" message is sent back to the calling phone to confirm that the call has been placed. Finally, the calling phone sends an "ACK" message to confirm receipt of the "200 OK" message. The call is then set up and the calling and called phones can send media independently of the server. Media is exchanged using other protocols that are not relevant to this invention.

Normally, this set up stage and subsequent messages would be sent using the same transport protocol, either TCP or UDP, throughout. In the present invention, the transport protocol is changed during the initial set up of the call. This involves switching the call from using the TCP transport to the UDP transport as call set-up is completed. This means that the security and fragmentation benefits of TCP can be used in call set-up, but once the call is established, any further in-call signalling uses the UDP transport.

In the following embodiments, call initiation in different circumstances is described. In each example, it is assumed that the phone (Phone A) has previously registered with the server (Server A) using TCP. The action of registering with the server effectively opens a pinhole in the NAT firewall to allow TCP traffic to flow between the server and phone in both directions. Without the pinhole, traffic from the server would not pass through the NAT to the phone. It is assumed that no UDP pinhole is open initially and, therefore, that the server cannot send UDP messages to the phone.

Figure 1A:
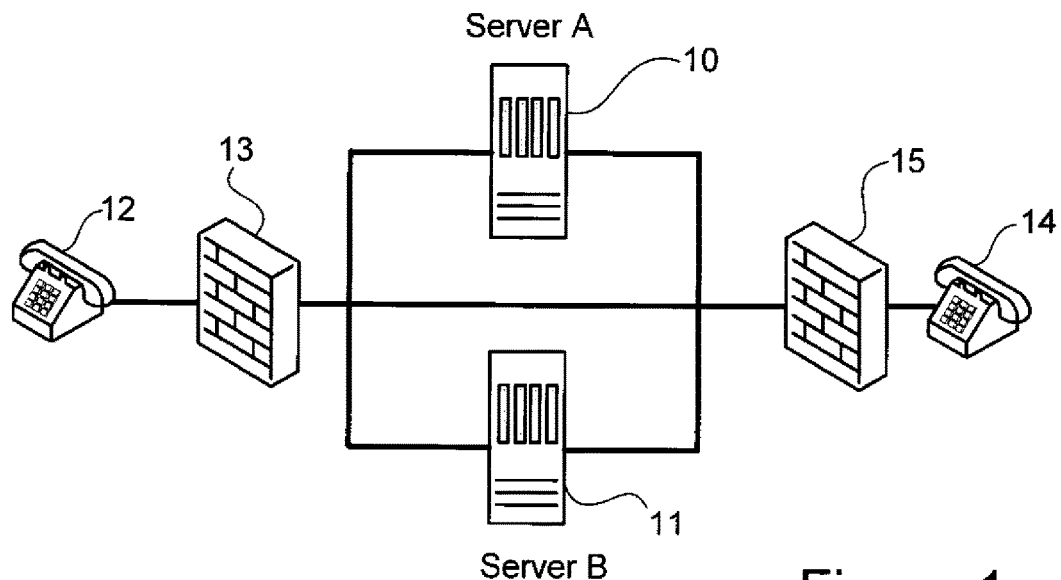
FIG. 1a illustrates a simplified arrangement of a typical SIP network.
Figure 1B:
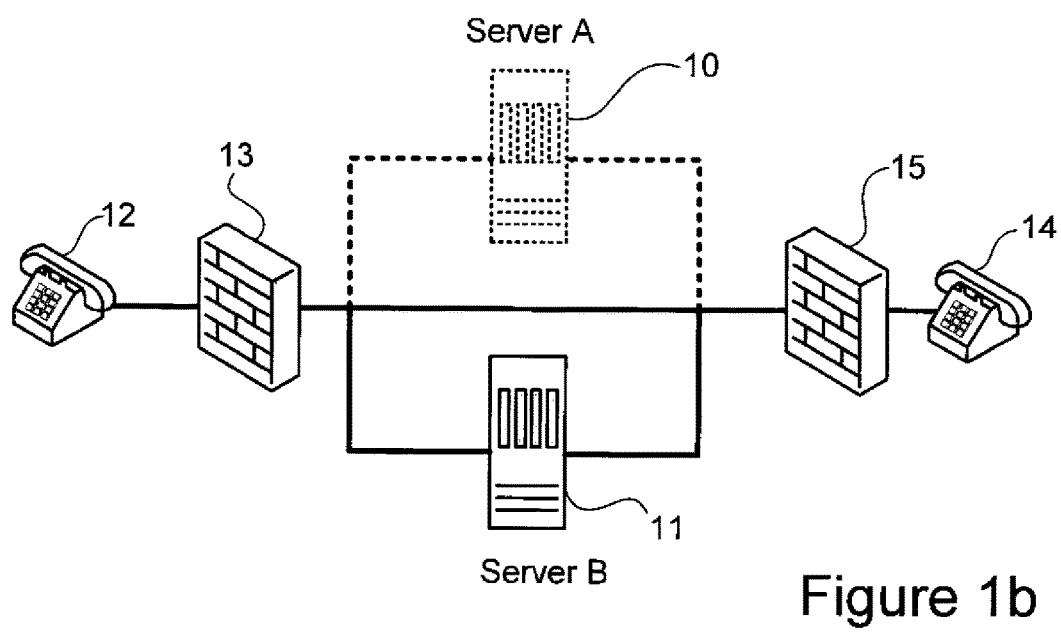
FIG. 1b illustrates the network of FIG. 1a after Server A becomes unavailable.

The invention may be applied to the server or the phone or both, to allow compatibility with equipment that is not enabled with the invention. The embodiments below describe the application of the invention to both phone and server and also situations where a call is initiated by the phone or by the server. In the examples below, only one end of the communication will be shown, i.e. the left or right halves of the arrangement of FIG. 1.

Figure 2:
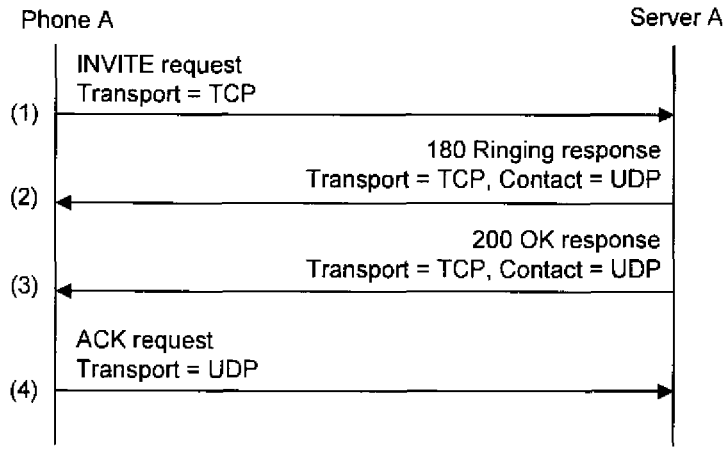
FIG. 2 shows the communications in a phone initiated call to a server according to the present invention.

In a first embodiment of the present invention, the invention is applied to server, Server A. The phone, Phone A is relatively standard and simply conforms to the existing SIP specification. In this example, the phone initiates a call. As shown in FIG. 2, the call begins as normal by sending (1) an INVITE message to Server A. This message is sent using TCP transport protocol as this is the established transport protocol from the previous registration.

The response messages (2, 3) sent from Server A in response to the INVITE are used to cause Phone A to send the ACK message (4) via UDP, thus opening the UDP pinhole. In this embodiment, the optional provisional (180 Ringing) response message is sent (2) over the same transport (TCP) as the request, as this is mandated by the SIP specification (RFC 3261). However, the "Contact" header in the response specifies UDP, which tells Phone A that all future in-dialog messages for this call should be sent over UDP. For example the message may contain the following:

SIP/2.0 180 Ringing
Via: SIP/2.0/TCP downstream.com;branch=some-random-branch
From: Caller<sip:caller@upstream.com>;tag=upstream-tag
To: Callee<sip:callee@downstream.com>;tag=downstream-tag
Call-ID: 12345@example.com
CSeq: 1 INVITE
Contact:<sip:5.6.7.8:5060>;transport=UDP Once the called party accepts the call, the "200 OK" message is sent (3). This is sent from Server A over TCP (as mandated by RFC 3261), with the same Contact header as the provisional response. The contact details in the response messages instruct Phone A to use UDP to send response messages. In this example, the Contact header in the "180 Ringing" and the "200 OK" messages is the same, i.e. UDP in this example. It is alternatively possible to only specify UDP as the response transport protocol in the "200 OK" message. This will cause Phone A to use UDP in future messages for this call, as the 200 OK overrides any previously specified protocol. Further alternatively, the contact header in the 180 Ringing message could specify UDP as the response transport protocol, and the 200 OK message could fail to specify a transport protocol. In this scenario, the transport protocol specified in the 180 Ringing message is not overridden, and Phone A will still send the ACK message via UDP. In both alternative scenarios described above, the ACK is still sent over UDP, and so the UDP pinhole is still opened.

Phone A then sends (4) the normal ACK message using UDP, as specified by the previous response messages. This opens a UDP pinhole in the NAT and allows future signalling via UDP to pass through the NAT. This ensures SIP communications can be preserved if the TCP connection between Phone A and the Server fails, such as might happen if Server A becomes unavailable.

In the above example, the call is initiated by Phone A, which operates as a standard phone with no modification required to accommodate the invention. It simply responds according to the messages received.

In the following example, the phone A is the recipient of a call and again may be a standard phone.

A caller at Phone B wishes to contact Phone A and initiates a call. Phone B sends an INVITE message to initiate the call. This is passed through to Server A, which sends (1) an INVITE message to Phone A using TCP. Phone A has already registered with Server A causing a TCP pinhole to open in the NAT.

Figure 3:
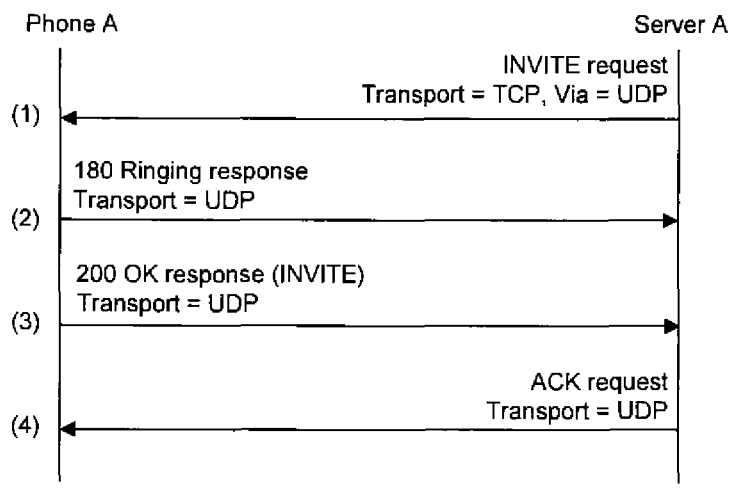
FIG. 3 shows the communications in a call initiated by a server according to the present invention, to a phone.

As shown in FIG. 3, the INVITE message includes a "Via" header which specifies UDP. Although this is not a standard approach, it is permitted by RFC 3261 and SIP endpoints are not required to attempt to match the transport specified in the Via header with the transport over which the message was actually received. This is in keeping with the principle that SIP processing is independent of the underlying transport protocol. The following is an example of an INVITE message:

INVITE sip:callee@1.2.3.4:5060 SIP/2.0
Via: SIP/2.0/UDP downstream.com;branch=some-random-branch
From: Caller<sip:caller@upstream.com>;tag=upstream-tag
To: Callee<sip:callee@downstream.com>
Call-ID: 12345@example.com CSeq: 1 INVITE Contact:<sip:5.6.7.8:5060>;transport=UDP Phone A will inspect the Via header, see that it specifies UDP, and then may attempt to send (2) the provisional response ("180 Ringing") over UDP, thus opening a UDP pinhole in the NAT. The Via header in the SIP request tells the receiving device where to send the response to and the protocol to use. If the Via header specified TCP, the phone would send the response over TCP and no UDP pinhole would be opened. By specifying UDP in the Via header, the Phone A responds using UDP which also opens a UDP pinhole to allow UDP message to be received by Phone A.

The Contact header is used to tell the device where to send subsequent requests, but does not affect routing of the response to the initial request.

Phone A then sends (3) a final response ("200 OK") to the INVITE again over UDP. This opens the UDP pinhole if a provisional response, such as the 180 Ringing response, was not sent. The Server is then able to use the opened UDP pinhole to transmit (4) the ACK request.

Figure 4:
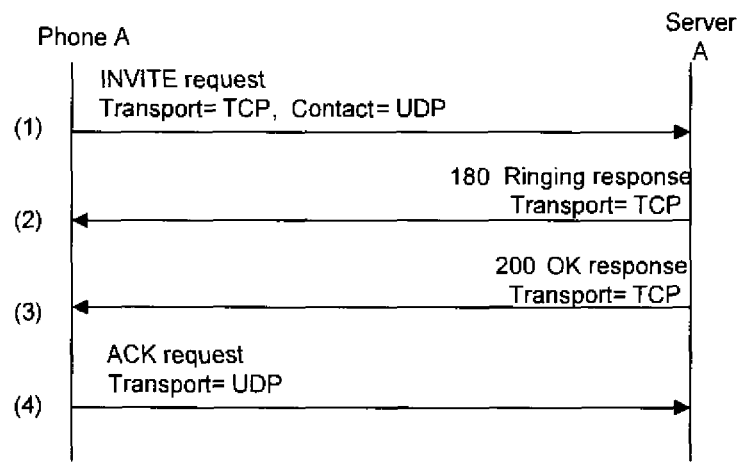
FIG. 4 shows the communications in a call initiated by a phone according to the present invention, to a server.

In a second embodiment of the invention, the phone incorporates the invention and the server is otherwise standard. In a first example, the phone initiates the call. As shown in FIG. 4, Phone A initiates the call by sending (1) an INVITE request over TCP to Server A. The "Contact" header in the INVITE specifies UDP transport, which tells Server A that all future in-dialog messages should be sent over UDP. An example of the INVITE request is shown below:

INVITE sip:callee@1.2.3.4:5060 SIP/2.0

Via: SIP/2.0/UDP downstream .com;branch=some-random-branch

From: Caller<sip:caller@upstream.com>;tag=upstream-tag

To: Callee <sip:callee@downstream.com>

Call-ID: 12345@example.com

CSeq: 1 INVITE

Contact: <sip:5.6.7.8:5060>;transport=UDP

Although the INVITE specifies UDP transport, the optional provisional response is sent (2) over the same transport as the request (TCP) as this is mandated by the SIP specification (RFC 3261). For similar reasons, the final response is also sent (3) over TCP.

Phone A sends (4) the ACK over UDP, which opens a UDP pinhole in the NAT. This allows future signalling to be preserved if the TCP connection between Phone A and Server A fails.

In the next example, shown in FIG. 5, Phone A is again configured according to the invention but the call is initiated from a remote caller, Phone B. Phone B wishes to call Phone A and initiates a call. This causes Server A to send (1) an INVITE request over TCP to Phone A.

The optional provisional response is sent (2) over the same transport as the request (TCP) as this is mandated by the SIP specification (RFC 3261). This creates an initial dialog between Phone A and Server A allowing in-dialog messages to be exchanged.

Phone A sends (3) an in-dialog OPTIONS request over UDP to Server A. This opens a UDP pinhole in the NAT and allows future signalling to be preserved if the TCP connection between Phone A and Server A fails. An example of the OPTIONS request message is shown below:

OPTIONS sip:callee@1.2.3.4:5060 SIP/2.0

Via: SIP/2.0/UDP downstream.com;branch=some-random-branch

From: Caller<sip:caller@upstream.com>;tag=upstream-tag

To: Callee<sip:callee@downstream.com>

Call-ID: 12345@example.com

CSeq: 1 OPTIONS

The main function of the OPTIONS request is to open a UDP pinhole in the NAT. This is achieved by sending it using UDP. Whilst the message specifies the reply transport as UDP, the server would respond using UDP anyway, according to the SIP specification.

The Server responds (4) to the OPTIONS request over the same transport as it was received on (UDP), as RFC 3261 specifies this. The Server sends (4) a "200 OK" response (OPTIONS) message.

The OPTIONS request does not need to have any effect on the server at all; it is primarily used to open the UDP pinhole. In fact, it would not matter if the server failed to process the OPTIONS and sent a negative response because the act of sending the message opens the UDP pinhole and so the response is irrelevant. Accordingly, any UDP message would suit including an INFO message, or even a non-SIP datagram.

Phone A then sends (5) a final response to the INVITE over TCP since this is again mandated by RFC 3261. The Contact header on the response specifies UDP which tells the Server that all future in-dialog messages should be sent over UDP. Finally, the Server sends (6) an ACK message over UDP, as instructed by the Contact header on the "200 OK" response confirming the call is established.

In each of the examples above, the switchover from initially using TCP, to set up the call, to UDP is achieved by forcing the client (or phone) to send a SIP message to the server using UDP, even though the call set-up is being done using TCP. When the client sends this message, a UDP pinhole will be opened in the NAT, thus allowing the server to send UDP messages to the client, as well as TCP messages. In other words, there are two stages to this invention for each example:

1. The phone must open a UDP pinhole in the NAT;

2. Communication between the phone and server must be switched from TCP to UDP.

n each of the 4 examples, the Contact header is used to switch communication from TCP to UDP. In the example shown in FIG. 2 and FIG. 4, this is sufficient because the phone will then send the next request (the ACK) using UDP, thus opening a UDP pinhole.

However, if it is the server that initiated the call (and therefore will be sending the ACK), an extra step is required to open the UDP pinhole so that the ACK can get through to the phone.

In the example of FIG. 3, the Via header is used to force the phone to send the response over UDP and therefore open the UDP pinhole.

Figure 5:
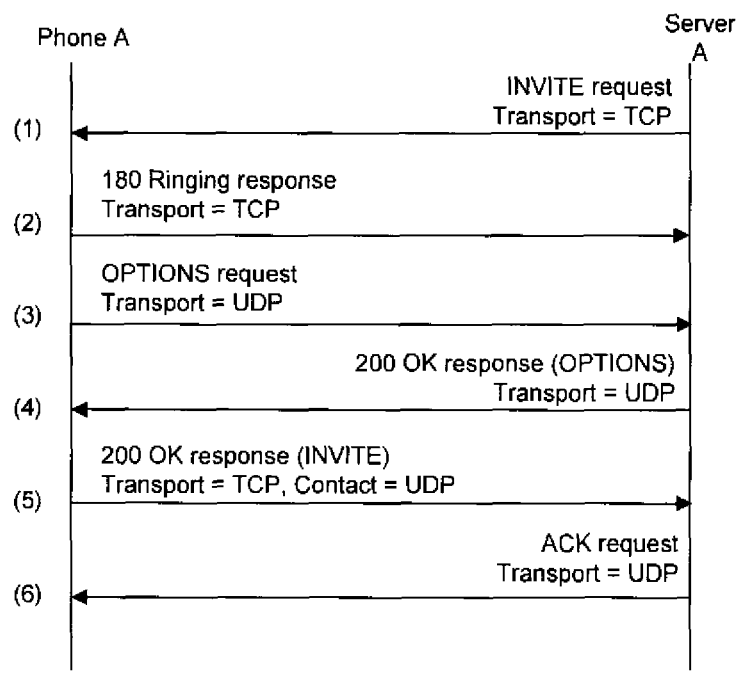
FIG. 5 shows the communications in a server initiated call to a phone according to the present invention.

In the example of FIG. 5, the phone cannot send the response over UDP because the INVITE from the server told it to send the response over TCP as it is a standard server. As the server is not enabled with the invention, it will not use a modified Via header specifying UDP (as in FIG. 3). This means the phone must do something else to open the UDP pinhole. As set out above, it sends an OPTIONS request over UDP. This has the effect of opening the pinhole but does not switch communication from TCP to UDP. The switch from TCP to UDP is done by the Contact header on the 200 response to the INVITE request.

With the arrangements described above, if a failure occurs, such that the primary server (server A) is no longer reachable by one or both of the endpoints, existing server location mechanisms will result in the backup server receiving the in-call signalling messages over UDP. These messages can then be forwarded to the client, if required, through the existing UDP pinhole. The TCP pinhole will most likely have been closed when the TCP connection failed, but even if it still exists, UDP messages cannot be sent through it.

To utilise the benefits outlined in this invention, the UDP pinhole should preferably remain open for at least the lifetime of the call. This can be done by the client and server exchanging UDP keep-alive messages (in the same way they would to keep the TCP connection alive). However, even if the UDP pinhole were to close, the invention can still be utilised, as the client could send another in-call signalling message to re-open the UDP pinhole (for example, an OPTIONS or INFO message). The only time this would result in call failure is if the server needed to forward a signalling message before the client re-opened the UDP pinhole as the server has no way of re-opening the pinhole itself.

References to phone or client in this document refer to the call termination equipment such as a phone or computer, they may also be referred to as user agents. References to messages being sent to a phone or client includes sending messages to intermediate agents such as proxies or servers which then pass on corresponding messages for eventual reception by the phone or client. For example, if an INVITE message is sent to establish a call with phone B, then the message may be sent directly to phone B or it may be sent to an intermediary which receives the message and sends a further INVITE message on, possibly to a second intermediary, and so on until an INVITE message is received by the ultimate recipient, phone B. For simplicity, in this document, reference to messages being sent to an end recipient e.g. phone B is intended to cover the process of passing the INVITE message via intermediaries to the end recipient, phone B. Similarly, references to calls received for a phone is intended to refer to the possibility that the messages may have been received and sent by intermediaries.

In each of these communication scenarios above, only one device is enabled with the invention. The other device does not need any knowledge of the invention and merely needs to conform to the SIP specification (RFC 3261). However, the above scenarios would also work if both the phone and the server were enabled with the invention.

What is claimed is:

1. A SIP call server running software for initialising and managing SIP calls and configured to establish a UDP connection with a client via a firewall in which a UDP pinhole may only be opened by messages sent from the client side of the firewall, the server comprising:
   a hardware input port for receiving TCP SIP INVITE messages sent in order to establish a call with a call initiator;
   a response message generator for generating at least one TCP response message in response to receipt of a TCP SIP INVITE message, the at least one TCP response message specifying UDP as the new transport protocol wherein said at least one TCP response message is one of a SIP 180 message and a SIP 200 message; and
   a hardware output port for sending said at least one TCP response message to the call initiator.

2. A SIP call server according to claim 1, wherein said at least one TCP response message specifies UDP as the new transport protocol using the "Contact" header.

3. A SIP call server according to claim 1, wherein said at least one TCP response message is a "200 OK" response message specifying UDP as the new transport protocol.

4. A SIP call server according to claim 1, wherein said hardware output port sends subsequent, messages to the call recipient using UDP.

5. A method of controlling a SIP call server for initialising and managing SIP calls, to establish a UDP connection with a client via a firewall in which a UDP pinhole may only be opened by messages sent from the client side of the firewall, the method being performed on a SIP server and comprising:
   receiving, on said SIP server, a TCP SIP INVITE message sent in order to establish a call with a call initiator;
   generating, on said SIP server, at least one TCP response message in response to receipt of a TCP SIP INVITE message, the at least one TCP response message specifying UDP as the new transport protocol wherein said at least one TCP response message is one of a SIP 180 message and a SIP 200 message; and
   sending, from said SIP server, said at least one TCP response message to the call initiator.

6. A method according to claim 5, wherein said at least one TCP response message specifies UDP as the new transport protocol using the "Contact" header.

7. A method according to claim 5, wherein said at least one TCP response message is a "200 OK" response message specifying UDP as the new transport protocol.

8. A method according to claim 5, further comprising sending subsequent messages from said SIP server to the call initiator using UDP.

9. A SIP call server for initialising and managing SIP calls and configured to establish a UDP connection with a client via a firewall in which a UDP pinhole may only be opened by messages sent from the client side of the firewall, the server comprising:
   a processor;
   a memory connected to the processor, the memory being operable to provide instructions to the processor for processing;
   a call initiator arranged for generating a SIP INVITE message, the SIP INVITE specifying that response messages should be sent using UDP as the transport protocol; and
   a hardware output port for sending said SIP INVITE message to a call recipient using TCP as the transport protocol.

10. A SIP call server according to claim 9, wherein said SIP INVITE message specifies UDP as the response transport protocol using the "Via" header.

11. A SIP call server according to claim 9, wherein said hardware output port sends an acknowledgement message using UDP, in response to a received response message.

12. A SIP call server according to claim 9, wherein said hardware output port sends subsequent messages to the call recipient using UDP.

13. A method of controlling a SIP call server for initialising and managing SIP calls, to establish a UDP connection with a client via a firewall in which a UDP pinhole may only be opened by messages sent from the client side of the firewall, the method being performed on a SIP server and comprising:
   generating, on said SIP server, a SIP INVITE message, the SIP INVITE message specifying that response messages should be sent using UDP as the transport protocol; and
   sending, from said SIP server, said SIP INVITE message to a call recipient using TCP as the transport protocol.

14. A method according to claim 13, wherein said SIP INVITE message specifies UDP as the response transport protocol using the "Via" header.

15. A method according to claim 13, further comprising sending, from said SIP server, an acknowledgement message using UDP in response to a received response message.

16. A method according to claim 13, wherein subsequent messages to the call recipient are sent using UDP.

17. A SIP user agent hardware device running software for initialising and managing SIP calls and configured to establish a UDP connection with a server via a firewall in which a UDP pinhole may only be opened by messages sent from the SIP user agent side of the firewall, the hardware device comprising:
  a call initiator arranged for generating a SIP INVITE message and specifying in the SIP INVITE message that response messages should be sent using UDP as the transport protocol;
  a hardware output port for sending said SIP INVITE message using TCP as the transport protocol to a server; and
  a hardware input port arranged to receive response messages to determine if the call set up has been successful, wherein
  said call initiator is further arranged to generate a SIP ACK message using UDP as the protocol, in response to receipt of a response message by said hardware input port, and
  said hardware output port sends said SIP ACK message.

18. A SIP user agent hardware device according to claim 17, wherein said SIP INVITE message specifies UDP as the transport protocol using the "Contact" header.

19. A SIP user agent hardware device according to claim 17, wherein said hardware output port sends subsequent messages to the server using UDP.

20. A method of controlling a SIP user agent for initialising and managing SIP calls, to establish a UDP connection with a server via a firewall in which a UDP pinhole may only be opened by messages sent from the SIP user agent side of the firewall, the method being performed on a SIP user agent and comprising:
  generating, on said SIP user agent, a SIP INVITE message and specifying in the SIP INVITE message that response messages should be sent using UDP as the transport protocol;
  sending, from said SIP user agent, said SIP INVITE message using TCP as the transport protocol to a server;
  receiving, on said SIP user agent, response messages to determine if the call set up has been successful;
  generating, on said SIP user agent, a SIP ACK message using UDP as the protocol, in response to receipt of a response message by said SIP user agent; and
  sending said SIP ACK message from said SIP user agent.

21. A method according to claim 20, wherein said SIP INVITE message specifies UDP as the transport protocol using the "Contact" header.

22. A method according to claim 20, wherein subsequent messages to the server are sent using UDP.

23. A SIP user agent hardware device running software for initialising and managing SIP calls and configured to establish a UDP connection with a server via a firewall in which a UDP pinhole may only be opened by messages sent from the SIP user agent side of the firewall, the hardware device comprising:
  a hardware input port responsive to TCP SIP INVITE messages from a call initiator;
  a message generator arranged to generate at least one configuration message in response to receipt of a TCP SIP INVITE message; and
  a hardware output port for sending said at least one configuration message using UDP as the transport protocol, wherein
  said message generator also generates a response message in response to receipt of said TCP SIP INVITE message, the response message specifying that further messages should be sent using UDP as the transport protocol wherein said response message is one of a SIP 180 message and a SIP 200 message; and
  said hardware output port sends said response message to the call initiator.

24. A SIP user agent hardware device according to claim 23, wherein said response message specifies UDP as the new transport protocol using the "Contact" header.

25. A SIP user agent hardware device according to claim 23, wherein said hardware output port sends subsequent messages to the server using UDP.

26. A method of controlling a SIP user agent for initialising and managing SIP calls, to establish a UDP connection with a server via a firewall in which a UDP pinhole may only be opened by messages sent from the SIP user agent side of the firewall, the method being performed on a SIP user agent and comprising:
  receiving, on said SIP user agent, a TCP SIP INVITE message from a call initiator;
  generating, on said SIP user agent, at least one configuration message in response to receipt of said TCP SIP INVITE message;
  sending, from said SIP user agent, said at least one configuration message using UDP as the transport protocol;
  generating, on said SIP user agent, a response message in response to receipt of said TCP SIP INVITE message, the response message specifying that further messages should be sent using UDP as the transport protocol wherein said response message is one of a SIP 180 message and a SIP 200 message; and
  sending said response message from said SIP user agent to the call initiator using TCP as the transport protocol.

27. A method according, to claim 26, wherein said response message specifies UDP as the new transport protocol using the "Contact" header.

28. A method according to claim 26, wherein subsequent messages to the server are sent, from the SIP user agent, using UDP.

* * * * *